(12) United States Patent
Rink et al.

(10) Patent No.: US 6,846,014 B2
(45) Date of Patent: Jan. 25, 2005

(54) INFLATABLE SURFACE INCLUDING A PLURALITY OF NOZZLES

(75) Inventors: Karl K. Rink, Princeton, ID (US); David J. Green, North Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 102 days.

(21) Appl. No.: 10/100,149

(22) Filed: Mar. 18, 2002

(65) Prior Publication Data

US 2003/0173761 A1 Sep. 18, 2003

(51) Int. Cl.[7] .................................................. B60R 21/26
(52) U.S. Cl. ........................................ 280/740; 280/736
(58) Field of Search ................................ 280/740, 737, 280/728.3, 731, 736, 742

(56) References Cited

U.S. PATENT DOCUMENTS

| | | | | |
|---|---|---|---|---|
| 3,827,715 A | * | 8/1974 | Lynch .......................... | 280/731 |
| 3,984,126 A | * | 10/1976 | Goetz et al. ................. | 280/740 |
| 4,013,305 A | * | 3/1977 | Ichihara ....................... | 280/742 |
| 4,101,146 A | * | 7/1978 | Oehm .......................... | 280/731 |
| 5,100,171 A | * | 3/1992 | Faigle et al. ................. | 280/736 |
| 5,116,080 A | * | 5/1992 | Wipasuramonton ......... | 280/741 |
| 5,437,472 A | * | 8/1995 | Kuretake et al. ............ | 280/737 |
| 5,806,885 A | * | 9/1998 | Hock ........................... | 280/737 |
| 6,328,336 B1 | * | 12/2001 | Takahashi et al. .......... | 280/737 |
| 6,394,491 B2 | * | 5/2002 | Soderquist et al. ......... | 280/736 |

* cited by examiner

Primary Examiner—David R. Dunn
(74) Attorney, Agent, or Firm—Sally J. Brown

(57) ABSTRACT

An airbag inflator housing is disclosed that provides a multi-dimensional inflation surface. The housing may include a back wall, a front wall, and at least one side wall connecting the front wall to the back wall to enclose a volume within the housing. A nozzle array may be integrated with the front wall. The nozzle array may include a plurality of pre-formed and sealed nozzles. The nozzles may be arranged according to a two-dimensional array to provide an inflation surface to inflate a connected airbag. The nozzles may be formed using MEMS processes to provide very small and precise nozzles.

36 Claims, 6 Drawing Sheets

INFLATABLE SURFACE INCLUDING A PLURALITY OF NOZZLES

BACKGROUND OF THE INVENTION

1. The Field of the Invention

The present invention relates to vehicle airbag systems. More specifically, the invention relates to an array of nozzles integrated with an inflator housing for even distribution of exhaust gas generated by the inflator.

2. Technical Background

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits. Airbags are generally required in most all new vehicles.

A modern airbag apparatus may include an electronic control unit (ECU) and one or more airbag modules. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of an inflator or gas generator which, in some embodiments, uses liquefied gas, compressed gas, solid fuel, and/or their combination. The inflator inflates a textile airbag that cushions a passenger during impacts to prevent injury to the passenger. In some airbag apparatuses, the airbag may be fully inflated within 50 thousandths of a second and deflated within two tenths of a second.

Airbag technology has advanced to include airbag apparatuses which protect occupants during a side impact, or roll-over accident. In these accidents, the occupant may be thrown against the windows, doors and side-walls of the vehicle. These airbag apparatuses are known as curtain airbags. Generally, the curtain airbag is attached to a thin long frame member which runs along a side of the roof of the vehicle. Often due to window size and visibility requirements, the curtain airbag apparatus, including the inflator are of a long thin shape. Other airbags inflate to position knee bolsters to keep an occupant within the vehicle and in an optimal position for other airbags to protect the occupant.

While many advances have been made in the textile bags used, as well as accident detection sensors, little has changed with regard to the airbag inflators. Generally, to provide sufficient inflation gas within the required short time period initiators connected to the inflators activate a gas generant. The gas generant may include compressed gas, liquefied gas, solid fuel, or a combination of these. Generally, the inflation gas is created from the rapid burning of pyrotechnic materials. The gas (also referred to herein as exhaust gas) escapes exit ports in the inflator at a high velocity and temperature.

Conventionally, the inflator includes one or two exit ports formed in the inflator housing. The exit ports are sized to ensure that sufficient exhaust gas escapes the inflator housing at an appropriate velocity to quickly fill the airbag. Generally, due to the velocity of the exhaust gas, the airbag inflates almost spherically from the location of the one or two exit ports.

Spherical inflation of the airbag may be problematic depending on the shape of the airbag. For example, with a driver's side airbag, which is generally spherical in shape, spherical inflation may not be a problem. However, in a curtain airbag, spherical inflation, or inflation from a single point source, may cause several problems including bag slap (referring to the un-inflated portion of an airbag striking an occupant while inflating). Spherical inflation may cause delayed inflation of certain airbag portions, and/or pre-stress portions of the airbag in the vicinity of the point inflation source such that the pre-stressed portions fail during operation of the airbag.

Regardless of the shape of the airbag, the airbag is preferably inflated very quickly and in a uniform manner. To overcome problems caused by spherical inflation, conventional inflators include a diffuser. A diffuser may be used to direct and diffuse the exhaust gas. The diffuser may be secured to the inflator and include a plurality of holes to allow the exhaust gas to be distributed over a larger surface area compared to a point inflation source.

Diffusers provide more uniform inflation of the airbag. However, using a diffuser impedes the flow of exhaust gas. Thus, more gas generant may be required to maintain the needed exhaust gas flow velocity. In addition, because diffusers are generally separate components, production, assembly and material costs for the airbag may be increased. In addition, with an additional part, the diffuser, the potential for defective parts, and/or assembly errors increases.

In addition, the holes of the diffuser are generally of a single size, and uniform shape. The holes generally do not accelerate the exhaust gas. Typically, the holes decelerate the exhaust gas. If exhaust gas velocity were increased, less gas generant may be required.

Furthermore, vehicle manufacturers are required to provide operable airbags for the expected life of a vehicle, which may be as long as ten to twenty years. Over the life of a vehicle, the inflator may be exposed to various temperatures and climates. This exposure may cause interference with the exit ports and/or diffuser holes. For example, condensation within the inflator may cause the gas generant to break up or become neutralized.

In addition, because most conventional inflators are limited to spherical inflation, certain limitations are imposed on how the airbag modules are packaged and where airbag modules are located within a vehicle. For example, due to space requirements and spherical inflation, airbag modules are generally not located in a door side panel. Instead, a side-impact airbag module may be located in a side of an occupant's seat. The airbag module may designed to accommodate spherical inflation by inflating forward to position an airbag between an occupant and the door. The airbag module may rely on an occupant being "in position" (occupants who are buckled, or riding in an anticipated position) during an accident. However, if an airbag module could inflate in two-dimensions from the door, more effective protection of an occupant may be provided. In addition, such an airbag could better protect occupants who may be out-of-position.

Accordingly, it would be an advancement in the art to provide an airbag inflator that has an inflatable surface including a plurality of nozzles. It would be a further advancement to provide an airbag inflator which allows the velocity of the exhaust gas to be controlled through the use of nozzles. Additionally, it would be an advancement in the art to provide an airbag inflator which is hermetically sealed from external elements. It would be another advancement in the art to provide an airbag inflator which allows for selective flow of exhaust gas through the plurality of nozzles. A further advancement in the art would be to provide an airbag inflator which includes fewer parts, reduces production costs, and reduces potential for defective parts and/or design flaws.

BRIEF SUMMARY OF THE INVENTION

The apparatus of the present invention has been developed in response to the present state of the art, and in particular, in response to the problems and needs in the art that have not yet been fully solved by currently available airbag inflators. Thus, the present invention provides an airbag inflator that includes a plurality of nozzles distributed across an inflation surface.

In one embodiment, the inflator includes gas generant disposed within a housing. The housing may comprise a back wall, front wall, and at least one side wall, each being joined together. Alternatively, these walls may be portions of a housing formed from a single piece of material. The housing may be of various shapes. For example, a cross-section taken between a front portion and back portion of the housing may be polygonal, circular, or the like.

The inflator includes gas generant disposed within the housing. Preferably, the gas generant is liquefied gas. Alternatively, the gas generant may be compressed gas, solid pyrotechnic material, or the like. Gas generant, as used herein, refers generally to any agent used to create or release exhaust gas to inflate an airbag.

The gas generant is in communication with an initiator. The initiator receives a signal that an accident event has occurred. In response, the initiator activate the gas generant to produce exhaust gas from the gas generant. Preferably, the initiator is connected to the housing.

In a preferred embodiment, the inflator includes a plurality of nozzles integrated within a wall of the housing. The nozzles are positioned so as to be in fluid communication with the gas generant to allow exhaust gas within the housing to escape through the nozzles. The nozzles may be positioned within the wall according to various configurations including a multi-dimensional array. For example, the plurality of nozzles may be arranged in a two-dimensional array of rows and columns which together form a polygon shape.

The plurality of nozzles allow the exhaust gas to escape the housing in a uniform manner from multiple points across one or more surfaces of the inflator. Therefore, the nozzles inflate portions of an airbag corresponding to the inflator surface at about the same time. Thus, spherical or point inflation is minimized.

In addition, the nozzles may be configured to provide more accurate control over how an airbag is inflated. For example, the nozzles may be of a convergent or convergent-divergent type such that the velocity and concentration of exhaust gas passing through the nozzles may be controlled. Preferably, all the nozzles are of the same shape and dimensions. Alternatively, the shape and dimensions of each nozzle may be varied to affect how the airbag is inflated.

In one embodiment, a nozzle includes a bore in the housing wall that does not completely penetrate the wall. The bore may be tapered to form a convergent type nozzle. Thus, the nozzle/bore is sealed with a seal at one end. Preferably, the seal is sized such that exhaust gas pressure built up within the housing ruptures the seal to allow the exhaust gas to escape. In this manner, the inflator may remain hermetically sealed while the airbag is not being used. Thus, condensation and other foreign materials are kept outside to ensure the airbag inflator functions properly when needed, even after an extended period.

In addition, in certain embodiments, the seals of certain nozzles may be configured to rupture more readily than the seals of other nozzles. For example, a first nozzle may include a seal which ruptures under less exhaust gas pressure than a second nozzle. Thus, the first nozzle ruptures prior to the second nozzle.

To facilitate rupture of the seals, a score may be etched across the seal to weaken the material and ensure proper rupture of the seal. The score may be positioned coaxially to a tapered bore which forms the nozzle.

Accordingly, the first nozzle and second nozzle, and others like them, may be strategically positioned within a wall of the inflator to control a flow of exhaust gas into an airbag. For example, nozzles with seals which rupture at different pressures may be arranged such that an airbag fills from the center towards the outside edges, or vice versa.

Preferably, the nozzles are very small in comparison to the size of the inflator or inflator walls. In certain embodiments, the nozzles are fabricated using microelectromechanical systems (MEMS) fabrication processes. Accordingly, the nozzles may have a diameter of between about one micron and about one-thousand microns. In tapered nozzles, the diameter may change throughout the cross-section of the nozzle. However, the minimum diameter in tapered nozzles may also be between about one micron and about one-thousand microns. The integrity of the inflator walls remains intact during operation of the inflator because the nozzles have such small diameters.

In certain embodiments, a front wall including the nozzle array may be a planar piece of material. Each nozzle may be defined by a bore which has a depth less than the thickness of the planar piece. The remaining material within the bore may form a seal. The planar piece may be attached to at least one side wall of the inflator by welding, including inertial welds.

In one embodiment, a curtain airbag inflator includes one or more nozzle arrays in a face of the inflator. The curtain airbag may include sectioned portions of the airbag which form protection zones to inflate and protect an occupant. The nozzle arrays may be positioned such that each nozzle array corresponds to a protection zone of the curtain airbag. In this manner, the protection zones may be quickly inflated and minimal gas generant may be required.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1:
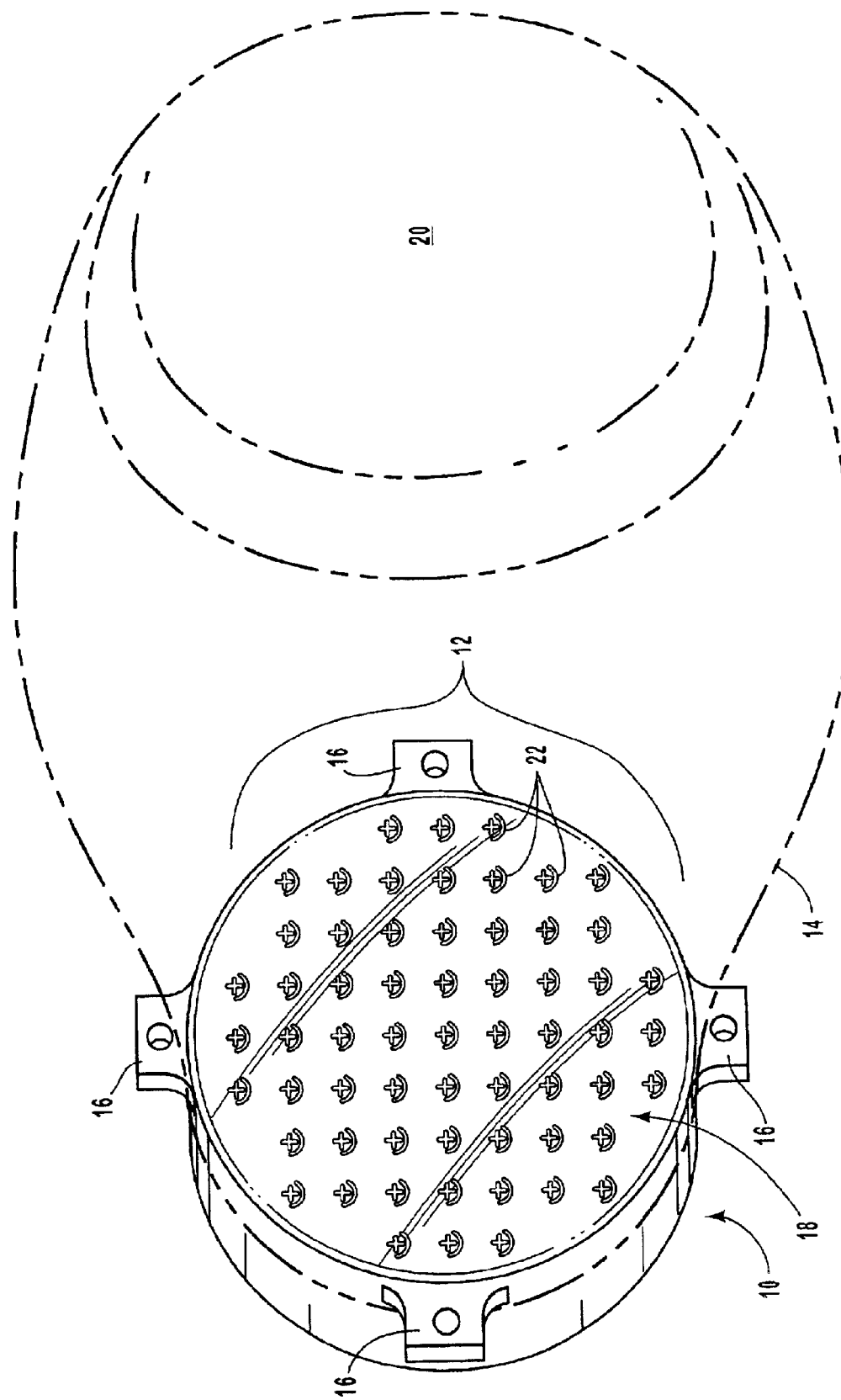
FIG. 1 is a perspective front view illustrating one embodiment of an inflator configured with nozzles distributed about a surface of the housing.

FIG. 1 is a perspective front view illustrating one embodiment of an inflator 10 including a nozzle array 12 according to the present invention. The inflator 10 is preferably in fluid communication with an airbag 14. The airbag 14 is illustrated in dashed lines to indicate the shape of the airbag 14 once inflated.

In certain embodiments, the inflator 10 is configured to house a very rapid production of exhaust gas without breaking apart. In addition, the inflator 10 is preferably light weight. Therefore, the inflator 10 is preferably made from a sturdy, rigid material such as metal, ceramic, hard plastic, or other similar material.

The inflator 10 includes one or more mounting tabs 16. The mounting tabs 16 are generally used to secure the inflator 10 to an airbag module housing (not shown), vehicle frame, or other vehicle component. The mounting tabs 16 may be connected to, or part of the inflator 10.

Conventionally, as discussed above, inflators 10 inflate an airbag 14 almost spherically. Spherical inflation may be reduced by four or five exit ports for the exhaust gas. However, conventional inflators 10 include less than ten exit ports because each additional exit port reduces the structural integrity of the inflator housing. With relatively few exit ports, airbags were still designed by assuming there is spherical inflation. Accordingly, the shape of an inflator 10 was not significant. The inflator 10 was simply sized to provide sufficient exhaust gas at an operable velocity.

However, as illustrated in FIG. 1, in certain embodiments of the present invention, a nozzle array 12 provides an inflation surface 18 which closely corresponds to the shape of the front surface 20 of the inflated airbag 14. Thus, the airbag 14 inflates more quickly and uniformly. Exhaust gas exits the inflator 10 from each nozzle 22 in the nozzle array 12 almost immediately to move a corresponding portion of the front surface away from the inflation surface 18.

Generally, the inflator 10 has a three-dimensional shape that corresponds to the two-dimensional inflation surface 18. For example, in the illustrated embodiment, the inflation surface 18 is generally circular in shape. Similarly, the inflator 10 providing the inflation surface 18 is disc shaped. Consequently, a cross-section of the inflator 10 between a front portion and back portion is circular. Of course the shape of the cross-section of the inflator 10 may correspond to any polygon, oval, or other shape.

The inflation surface 18 includes a nozzle array 12. The nozzle array 12 includes a plurality of nozzles 22. Preferably, the nozzles 22 are arranged uniformly in a two-dimensional array of rows and columns across the inflation surface 18. The rows and columns may form a polygon shape. Alternatively, the nozzles 22 may be distributed randomly or according to a pre-determined pattern. The distribution pattern may also be influenced by chambers formed in the airbag 14.

Figure 2:
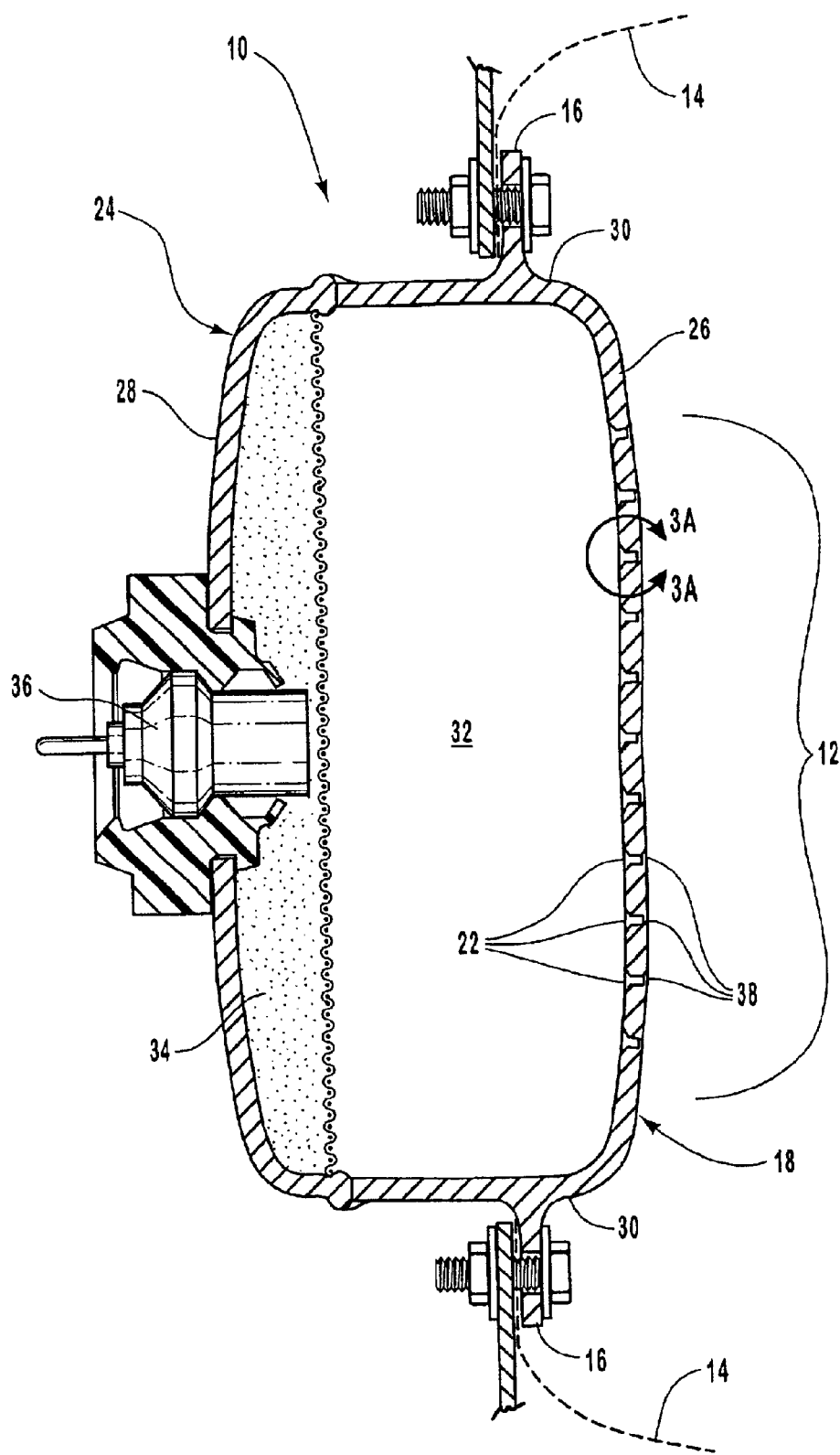
FIG. 2 is a perspective cross-section view illustrating one embodiment of a housing including a nozzle array.

Referring now to FIG. 2, a cross-section of an inflator 10 is illustrated. The inflator 10 includes a housing 24. The housing 24 may include a front wall 26, back wall 28, and at least one side wall 30. The walls 26, 28, 30 may be welded or comprise a single piece of material.

The housing 24 provides a chamber 32 for activating gas generant 34 stored therein. In one embodiment, the chamber 32 is a combustion chamber for the gas generant 34. Due to the spherical expansion of exhaust gas generated by the gas generant 34, the chamber 32 preferably includes a minimum number of corners. Corners generally experience higher stress during the high velocity expansion of exhaust gas than non-corner areas. The higher stress may cause the housing walls 26, 28, 30 to fail and fragment. In the illustrated embodiment, FIG. 2 illustrates a cross-section of FIG. 1. Accordingly, the side wall 30 is a single continuous rounded wall 30.

Referring still to FIG. 2, the gas generant 34 is in communication with an initiator 36. Generally, an initiator 36 receives an electric signal from an electronic control unit (ECU) when an accident situation is detected. The initiator 36 activates the gas generant 34 to inflate the airbag 14.

The type of initiator 36 used depends on the type of gas generant 34. Various types of gas generant 34 may be used including liquefied gas, compressed gas, solid pyrotechnic material, or the like. For example, in a preferred embodiment, the gas generant 34 is a volume of liquefied gas. Accordingly, the initiator 36 may be an electric squib which provides an electric signal to cause the liquefied gas to generate exhaust gas.

Exhaust gas generated within the chamber 32 escapes through the plurality of nozzles 22. As discussed above, inflation of the airbag 14 may be uniform and controlled if exhaust gas escapes through an inflation surface 18, the plurality of nozzles 22. Therefore, the exhaust gas should be evenly distributed within the chamber 32.

In certain embodiments, to accomplish even distribution within the chamber 32, the gas generant 34 may be evenly distributed opposite the nozzles 22. In addition, the initiator 36 may be coupled to one or more ignition transfer lines (not shown) disposed over the surface of a solid pyrotechnic material or within a volume of liquefied gas. The ignition transfer lines distribute an ignition signal such that the gas generant 34 is almost uniformly activated. Generally, uniform activation of the gas generant 34 causes uniform distribution of exhaust gas within the chamber 32.

As mentioned above, the inflation surface 18 includes a plurality of nozzles 22, a nozzle array 12, integrated with the front wall 26. Preferably, the nozzles 22 are in fluid communication with the gas generant 34 by way of the chamber 32. The nozzles 22 allow the exhaust gas to exit the inflator 10 and inflate the airbag 14.

The nozzles 22 may be used to control how an attached airbag 14 is inflated. Preferably, the nozzles 22 are substantially cone shaped to accelerate the exhaust gas as pressure within the chamber 32 forces the gas through the nozzles 22. By accelerating the exhaust gas less gas generant 34 may be needed to inflate the airbag 14 at the necessary velocity.

The number and size of nozzles depends on several factors including the volume of the airbag 14 to be inflated, the desired inflation rate for the airbag 14, and the capacity of the nozzles 22 to accelerate the exhaust gas. Generally, the nozzles 22 are sized such that the structural integrity of the front wall 26 is maintained when the airbag module is activated. Therefore, the nozzles 22 are generally very small in comparison to the housing 24 and other airbag module components.

As seen in FIG. 2, the shape of a nozzle 22 may be non-uniform. For example, the nozzle 22 may include a diameter which varies from one side of the nozzle 22 to the other. In certain embodiments, the nozzle diameter may range from about 1 micron and about 1000 microns. In contrast, the dimensions for other airbag module components may be measured in terms of millimeters, or inches. Alternatively, the nozzles 22 may include a uniform diameter ranging from about 1 micron and about 1000 microns. Thus, compared to other inflator components, the nozzles 22 are very small.

In a preferred embodiment, each nozzle 22 includes a seal 38. FIG. 2 illustrates seals 38 formed as part of the front wall 26 when the nozzles 22 are manufactured. Alternatively, the nozzles 22 may extend through the front wall 26 and the seals 38 may be subsequently added. Preferably, the seals 38 have a thickness which allows the seals 38 to readily rupture due to a shock wave caused by activation of the gas generant 34. Alternatively, the seals 38 may be ruptured by increasing exhaust gas pressure within the chamber 32. Seals 38 are discussed in more detail below.

The size of the nozzles 22 affects the number of nozzles 22 included in the nozzle array 12. The number of nozzles 22 is directly related to the desired flow area for the inflator 10 and the size of the nozzles 22. In one embodiment, the number of nozzles 22 may range between about one million to about fifty nozzles 22. In a preferred embodiment, the number of nozzles 22 may range between about fifty-thousand to about one-hundred nozzles 22. And in a more preferred embodiment, the number of nozzles 22 may range between about ten-thousand to about two-hundred and fifty nozzles 22.

In certain embodiments, the small size of the nozzles 22 may cause problems with the flow of exhaust gas through the nozzle array 12. Generally, exhaust gas includes particulates and gas generant residue which may clog the nozzles 22. One way to minimize this problem is to use a gas generant 34 which produces minimal residue. For example, in a preferred embodiment, liquefied gas is used as the gas generant 34.

The size of the nozzles 22 throughout a nozzle array 12 may be uniform. Alternatively, the nozzle sizes may vary to control the flow of exhaust gas from the nozzle array 12. For example, smaller nozzles 22 may be around the perimeter of a nozzle array 12 to cause more exhaust gas to pass through the center portions of the nozzle array 12.

Generally, nozzles 22, of the sizes mentioned above, require very precise fabrication processes. In certain embodiments, microelectromechanical systems (MEMS) processes are used. MEMS processes facilitate precision fabrication on a microscopic and/or even nano size level. MEMS processes generally involve adding or removing very thin substrates of material to form the desired component. MEMS processes may be used with glass, silicon, quartz, ceramic, plastic, and metal substrates.

In MEMS processes that remove material, certain portions of a material substrate may be treated with a kind of marker. The marker may be designed to be etched or dissolved away by a chemical, laser or other similar technique. Next, a subsequent substrate may be marked for etching. The process may be repeated for each successive substrate of a material.

In certain embodiments, the front wall 26 may be formed from one or more substrates which may be dissolved using markers as described above. Each substrate may be etched or dissolved according to a pattern to define the nozzles 22 as well as vary the diameter of one or more of the nozzles 22 with each substrate.

In addition, in some configurations, a final substrate defining the front surface of the front wall 26 may be left intact to form the seal 38 for each pre-formed nozzle 22. The seals 38 hermetically insulate the chamber 32 and gas generant 34 from external contaminants such as condensation, and other materials. If the nozzles 22 are not sealed, particles including dust may clog the very small nozzles 22. Alternatively, contaminants entering the chamber 32 may affect the performance of the gas generant 34. Generally, an inflator 10 should remain operable for about fifteen years. The seals 38 help ensure that the inflator 10 will function properly throughout the expected inflator life span.

Preferably, the seals 38 are ruptured when the airbag module is activated. The seals 38 may be ruptured by a shock wave generated by activation of the gas generant 34 and/or built up exhaust gas pressure within the chamber 32. In one embodiment, the seals 38 have a uniform thickness throughout the nozzle array 12. Alternatively, the thickness of the seals 38 may be varied such that one seal 38 ruptures before another seal 38 in the nozzle array 12.

Figure 3A:
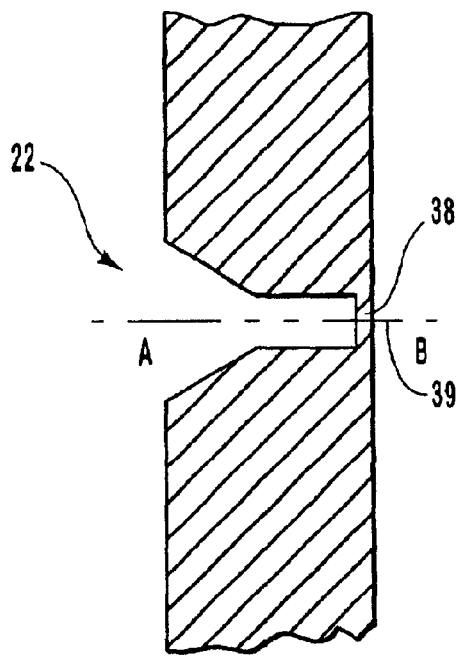
FIG. 3A is a perspective cross-section view illustrating a convergent nozzle.
Figure 3B:
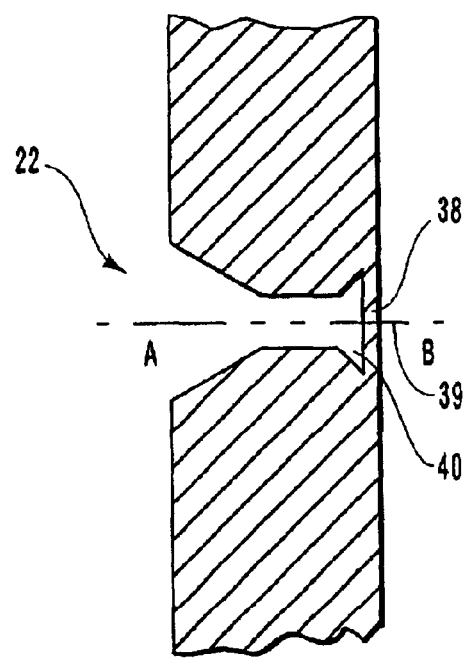
FIG. 3B is a perspective cross-section view illustrating a convergent-divergent nozzle.

FIGS. 3A and 3B illustrate cross-sections of two types of nozzles 22. In FIG. 3A, the nozzle 22 is a convergent nozzle. Generally, convergent nozzles 22 begin with a maximum interior diameter on the entry end A of the nozzle 22 and gradually taper to a minimum diameter near the exit end B. As exhaust gas enters the nozzle 22 at entry end A the shape of the nozzle forces the gas toward a central axis 39 and through the nozzle 22, thus accelerating the exhaust gas. In a preferred embodiment, the nozzle 22 is sealed by seal 38 at the exit end B. The seal 38 may be ruptured as discussed above to allow the exhaust gas to escape.

Referring now to FIG. 3B, a convergent-divergent nozzle 22 is illustrated. The shape of the interior diameter of the convergent-divergent nozzle 22 is very similar to the shape of the convergent nozzle described in relation to FIG. 3A. However, the nozzle 22 includes a divergent portion 40 near the exit end B. The interior diameter of the nozzle gradually increases from the minimum interior diameter to a divergent diameter within the divergent portion 40.

Thus, with a convergent-divergent nozzle 22 the exhaust gas initially converges and accelerates as discussed above. When the exhaust gas enters the divergent portion 40, the exhaust gas decelerates and disperses. In certain embodiments, convergent-divergent nozzles 22 may provide similar benefits to using diffusers. Dispersion of the exhaust gas allows the gas to cool and become less concentrated. The dispersed gas may then impart less stress on portions of the airbag 14 than non-diffused concentrated exhaust gas. Therefore, with certain embodiments a diffuser may not be required.

Of course various alternative nozzle shapes may be used. For example, a nozzle 22 may be a convergent-divergent type. However, a lateral cross-section of the divergent portion 40 may resemble a semi-circle rather than a circle. The semi-circle shaped divergent portion 40 may be used to direct the flow of exhaust gas exiting the nozzle 22. Exhaust gas exiting the semi-circle shaped divergent portion 40 may diffuse toward the arcuate perimeter of the semi-circle shaped divergent portion 40.

Figure 4A:
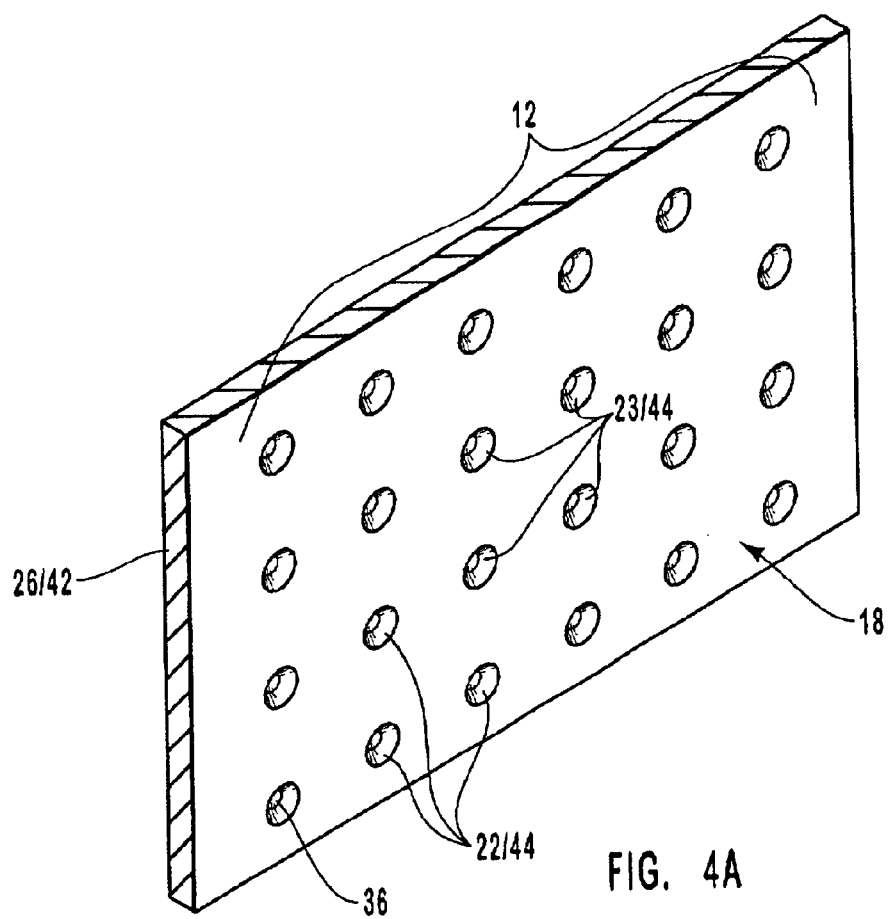
FIG. 4A is a perspective rear view of a wall of an inflator which includes nozzles defined by bores arranged in a two-dimensional array.

Referring now to FIG. 4A, a nozzle array 12 may be integrated with a separate piece of material 42, such as a front wall 26, which is attached to at least one side wall 30 to form the housing 24. The piece of material 42 may be attached using various conventional techniques including conventional welding, inertia welding, and the like.

In the depicted embodiment, the piece of material 42 is generally planar. Alternatively, the piece of material 42 may be an arcuate shape. As mentioned above, the shape of the wall 26, 42 generally determines the shape of the inflation surface 18. For example, if the desired inflation surface shape is rectangular, the wall 26, 42 is generally also of a rectangular shape.

The piece 26, 42 may include a plurality of nozzles 22 formed by bores 44. The bores 44 may be disposed on a rear side of the piece 26, 42. Preferably, the bores 44 include an interior diameter which is tapered to form a nozzle 22. In certain embodiments, the bores 44 are equally spaced in a configuration of rows and columns. Alternatively, the bores 44 may be irregularly positioned within the piece 26, 42.

The bores 44 may extend into the piece 26, 42 a predetermined depth not to exceed the thickness of the piece 26. The bores 44 may be formed using MEMS fabrication processes discussed above. The material at the bottom of a bore 44 may form a seal 38 similar to those discussed above in relation to FIGS. 3A and 3B.

The structural integrity of the seal 38 may be determined by the thickness of material left between the bore 44 and an opposite side of the piece 24, 42. Preferably, the seal 38 has a thickness which allows the seal 38 to rupture when an airbag module is activated. However, the seal 38 is thick enough to remain sealed during regular bumps and jolts involved with normal vehicle operation.

In certain embodiments, the thickness of the seals 38 may vary throughout the nozzle array 12 such that the seal 38 of a first nozzle 22 ruptures more readily than the seal 38 of a second nozzle 23. Accordingly, as discussed in more detail below, the nozzles 22 having seals 38 of varying strengths may be strategically placed within the nozzle array 12 to control the flow of exhaust gas exiting the nozzle array 12. Alternatively, or in addition, the size of the first nozzles 22 may be different from the size of the second nozzles 23 to affect the flow of exhaust gas exiting the nozzle array 12.

In one embodiment, the front wall 26, 42 may be embodied as an inflator face plate adapted for attachment to an inflator 10. The inflator face plate may be positioned between the interior volume of an airbag and the remainder of the inflator 10. Preferably, the inflator face plate is positioned such that exhaust gas generated within the inflator 10 escapes the inflator 10 by passing through the nozzles 22 of the plate. In a preferred embodiment, the inflator face plate is joined directly to an inflator housing 24.

Figure 4B:
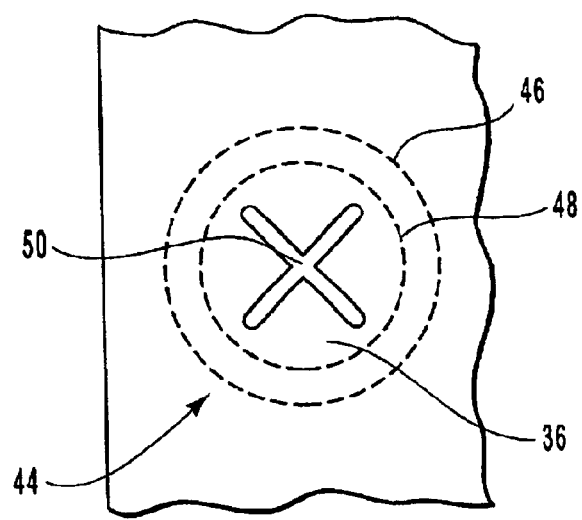
FIG. 4B is a perspective front view of a wall of an inflator illustrating a seal and a score used to control when nozzles rupture.

In FIG. 4B, a front view of the front wall 26, 42 of FIG. 4A is illustrated. FIG. 4B illustrates a single bore 44. The maximum interior diameter 46 of the nozzle 22 and the minimum interior diameter 48 are also illustrated with dashed circles.

In the illustrated embodiment, the tendency of the seal 38 to rupture may be controlled by including or excluding a score 50 over the seal 38. The score 50 may be in the form of an "X" or various other designs. The score 50 may be etched onto the seal 38 using MEMS processes. Because the seal 38 and nozzle 22 are so small, nozzles 22 which include a score 50 may rupture more readily than nozzles 22 without scores 50.

Figure 5:
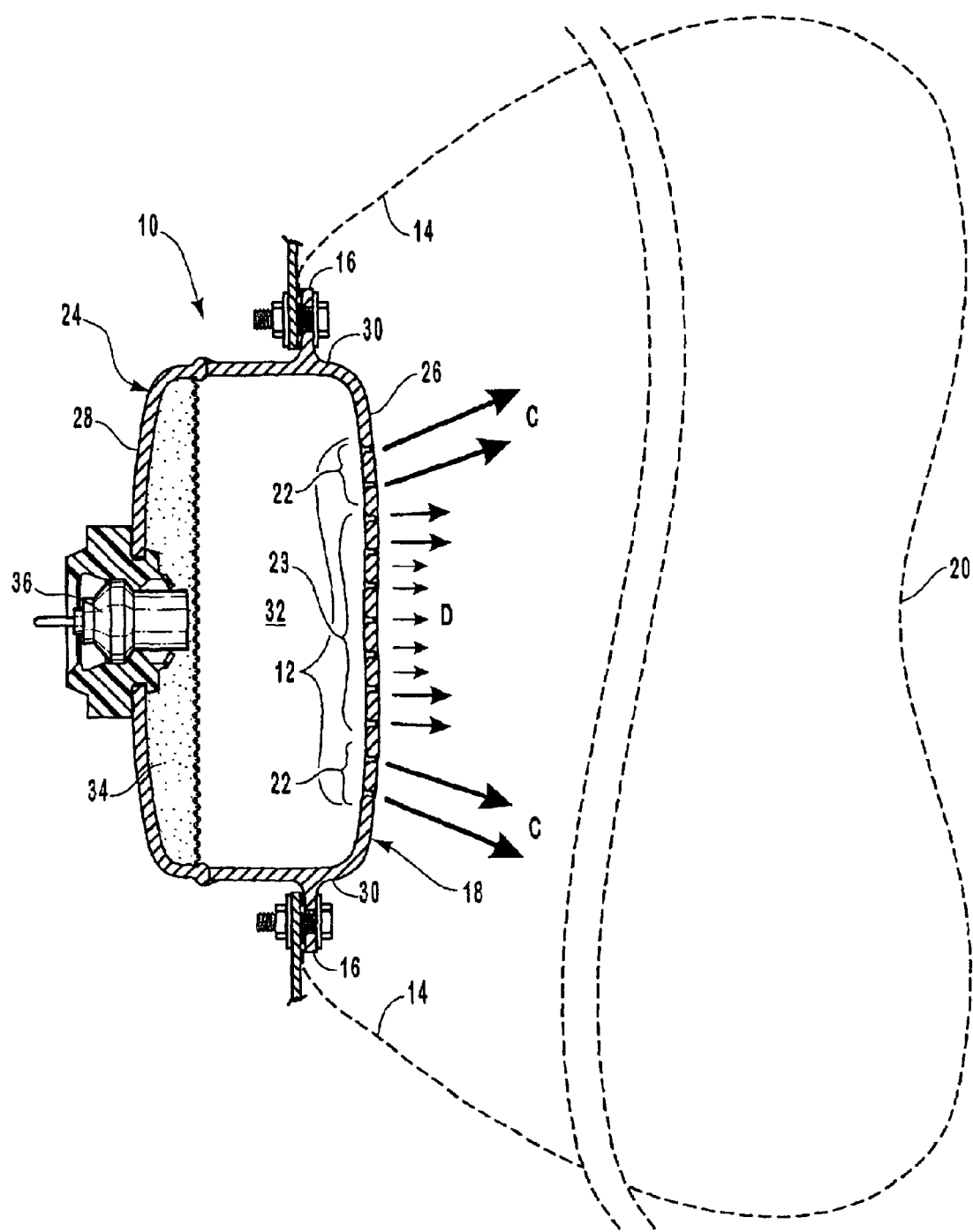
FIG. 5 is a perspective cross-section view illustrating an inflator in which nozzles of a nozzle array are configured to rupture at different times.

FIG. 5 illustrates a cross-section view of an inflator 10 configured to inflate an airbag 14 according to a predetermined pattern. In this embodiment, first nozzles 22 configured to rupture more readily may be positioned around the perimeter of the nozzle array 12. Second nozzles 23 configured to rupture under more pressure than first nozzles 22 may be placed near the center of the nozzle array 12.

By strategically positioning the nozzles 22, 23, the flow of exhaust gas into the airbag 14 may be controlled. For example, in the illustrated embodiment, the perimeter nozzles 22 may rupture first. Thus, the airbag 14 begins to inflate around the perimeter, represented by long arrows C. Shortly thereafter, the center nozzles 23 may rupture allowing the center portion of the airbag to begin inflating, represented by short arrows D.

In addition, as discussed above, nozzles 22 may be configured to control the flow of exhaust gas as well. For example, semi-circle shaped convergent-divergent nozzles 22 may be strategically positioned such that the exhaust gas flows to the perimeter portions of an airbag 14 before exhaust gas is directed toward the center of the airbag 14.

Figure 6:
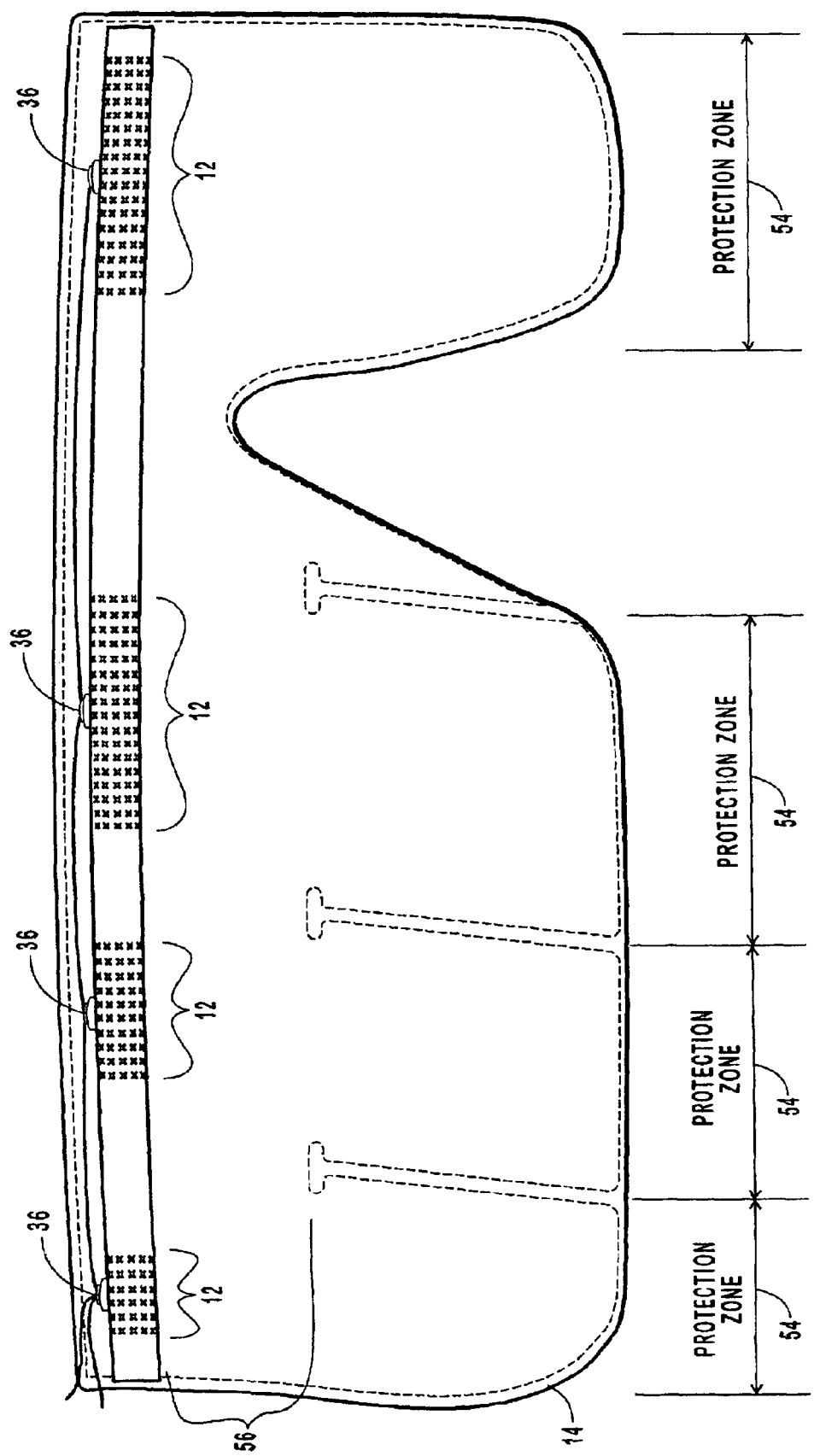
FIG. 6 is a perspective view illustrating a curtain airbag and curtain airbag inflator including nozzle arrays positioned to uniformly fill protection zones of the curtain airbag.

FIG. 6 illustrates a curtain airbag module 52 including an inflator 10 according to the present invention. Generally, the airbag 14 for a curtain airbag module 52 is divided in to one or more protection zones 54. Protection zones 54 serve to protect an occupant from one or more hazards along a side of a vehicle. Typically, protection zone locations correspond to the door and window locations along the side of the vehicle.

Conventionally, inflators 10 may fill the curtain airbag 14 from one end or the other. Thus, the exhaust gas must travel from one protection zone 54 to the next in succession from the end including the inflator 10. Accordingly, a top section 56 is typically provided to connect the protection zones 54. However, the delay involved in moving the exhaust gas between protection zones 54 delays the overall inflation time for the airbag 14. Therefore, the exhaust gas may be generated at a higher velocity to compensate for the delay. Higher velocity exhaust gas may cause the airbag 14 to injure an occupant.

In a preferred embodiment, one or more nozzle arrays 12 may be disposed along the length of an inflator 10 installed along a vehicle roof rail. Each nozzle array 12 may align with a protection zone 54. Thus, when the inflator 10 is triggered the exhaust gas exits the nozzle arrays 12 and directly enters an appropriate protection zone 54. In certain embodiments, the protection zones 54 may not include an interconnected top section 56.

The control of exhaust gas flow provided by nozzle arrays 12, which are sealed until activated, may be useful in various types of airbag modules. For example, nozzle arrays 12 may be used in an airbag module design for the interior surface of a vehicle roof to protect occupants during a roll-over. In addition, the nozzle arrays 12 may significantly reduce the packaging and placement concerns involved with conventional airbag modules which rely on spherical inflation techniques. Because nozzle arrays 12 are capable of providing an inflation surface 18, the nozzle arrays 12 maybe used in knee bolster airbag modules, side impact airbag modules, and others.

Referring now indirectly to FIGS. 1–6, in summary, embodiments of inflators 10 including nozzle arrays 12 are provided. The nozzles 22 are preferably sealed with seals 38 which rupture when the inflator 10 is activated. The nozzles 22 are preferably fabricated using MEMS processes to provide very small and precise nozzles 22. The small size of the nozzles 22 allows them to be positioned in various configurations within a wall 26, 28, 30 of an inflator 10. In one embodiment, the nozzles 22, 23 and/or the seals 38 may be configured to control how exhaust gas exits an inflator 10 and inflates an airbag 14. By controlling exhaust gas flow with the nozzles 22, 23, other conventional airbag module components such as a diffuser may be eliminated. In addition, the inflator 10 may provide an inflation surface 18 which provides essentially two-dimensional inflation rather than spherical inflation of an airbag 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An inflator, comprising:
    a housing;
    a gas generant disposed within the housing;
    an initiator in communication with the gas generant for initiating production of exhaust gas from the gas generant, the initiator being connected to the housing; and
    a plurality of nozzles disposed within a wall of the housing, the nozzles being in fluid communication with the gas generant to allow exhaust gas within the housing to escape, wherein at least one nozzle comprises a seal which is rupturable by exhaust gas pressure generated within the housing, wherein the seal is formed as part of the wall.

2. The inflator of claim 1, wherein at least one nozzle is fabricated using microelectromechanical systems (MEMS) fabrication processes.

3. The inflator of claim 1, wherein at least one nozzle is a convergent-divergent nozzle.

4. The inflator of claim 1, wherein the seal comprises a score etched on the seal of the at least one nozzle.

5. The inflator of claim 1, wherein the seal of a first nozzle is configured to rupture more readily than the seal of a second nozzle.

6. The inflator of claim 5, wherein the first nozzle is strategically positioned in the wall in relation to the second nozzle such that a flow of exhaust gas ruptures the seal of the first nozzle prior to rupturing the seal of the second nozzle.

7. The inflator of claim 1, wherein the nozzles have a diameter of between about 1 micron and about 1000 microns.

8. The inflator of claim 1, wherein the housing has a polygonal cross-section.

9. The inflator of claim 1, wherein the gas generant comprises liquefied gas.

10. The inflator of claim 1, wherein the gas generant comprises solid pyrotechnic material.

11. The inflator of claim 1, wherein the gas generant comprises compressed gas.

12. An inflator, comprising:

a housing;

a gas generant disposed within the housing;

an initiator connected to the housing and in communication with the gas generant; and a two dimensional nozzle array integrated with the housing, the nozzle array being in fluid communication with the gas generant to allow exhaust gas within the housing to escape wherein at least one nozzle of the array is a convergent nozzle.

13. The inflator of claim 12, wherein the nozzle array is fabricated using microelectromechanical systems (MEMS) fabrication processes.

14. The inflator of claim 13, wherein at least one nozzle of the array comprises a seal which is rupturable by exhaust gas pressure generated within the housing.

15. The inflator of claim 14, wherein the seal comprises a score etched in the seal of at least one nozzle.

16. The inflator of claim 15, wherein the seal of a first nozzle of the array is configured to rupture more readily than the seal of a second nozzle of the array.

17. The inflator of claim 16, wherein the first nozzle is strategically positioned within a wall of the housing in relation to the second nozzle such that a flow of exhaust gas ruptures the seal of the first nozzle prior to rupturing the seal of the second nozzle.

18. The inflator of claim 17, wherein the nozzles of the array have a diameter of between about 1 micron and about 1000 microns.

19. The inflator of claim 18, wherein the nozzles are arranged within a wall of the housing in rows and columns according to a polygon shape.

20. The inflator of claim 19, wherein the housing has a circular cross-section.

21. The inflator of claim 20, wherein the gas generant comprises liquefied gas.

22. The inflator of claim 20, wherein the gas generant comprises solid pyrotechnic material.

23. The inflator of claim 20, wherein the gas generant comprises compressed gas.

24. An airbag inflator housing, comprising:

a back wall;

a front wall;

a nozzle array integrated with the front wall, wherein at least one nozzle comprises a bore, the bore having a depth that does not completely penetrate the wall; and at least one side wall connecting the front wall to the back wall to enclose a volume within the airbag inflator housing.

25. The airbag inflator housing of claim 24, wherein the nozzle array is fabricated using microelectromechanical systems (MEMS) fabrication processes.

26. The airbag inflator housing of claim 24, wherein the front wall, back wall and at least one side wall are portions of a single whole piece of material.

27. The airbag inflator housing of claim 24, wherein the front wall comprises:

a planar piece of material having a plurality of nozzles formed in one side; and wherein opposite the bore the planar piece includes a score positioned coaxial with the bore.

28. The airbag inflator housing of claim 24, wherein the interior diameter of at least one bore is tapered.

29. The airbag inflator housing of claim 27, wherein the planar piece is attached to the at least one side wall by welding.

30. An inflator face plate, comprising:

at least ten nozzles disposed within the plate;

wherein the plate is positioned such that exhaust gas generated within an airbag inflator escapes the inflator by way of the nozzles of the plate to inflate an airbag, wherein the nozzles have a diameter of between about 1 micron and 1000 microns.

31. The inflator face plate of claim 30, wherein the nozzles are disposed within the plate according to a two dimensional array.

32. The inflator face plate of claim 30, wherein the plate is attached to the airbag inflator.

33. The inflator face plate of claim 30, wherein the plate comprises between about fifty to about one million nozzles.

34. The inflator face plate of claim 30, wherein a nozzle comprises a seal.

35. The inflator face plate of claim 30, wherein the plate is planar.

36. The inflator face plate of claim 30, wherein the plate is curved.

* * * * *